US006478868B1

(12) United States Patent
Reddy et al.

(10) Patent No.: US 6,478,868 B1
(45) Date of Patent: Nov. 12, 2002

(54) EARLY-ENHANCED STRENGTH CEMENT COMPOSITIONS AND METHODS

(75) Inventors: Baireddy R. Reddy, Duncan, OK (US); Ronald J. Crook, Duncan, OK (US); Bryan K. Waugh, Duncan, OK (US); Russell M. Fitzgerald, Waurika, OK (US); Dennis W. Gray, Comanche, OK (US); Brent E. Traxel, Junction City, KS (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/383,734

(22) Filed: Aug. 26, 1999

(51) Int. Cl.⁷ .............................................. C04B 38/10
(52) U.S. Cl. ...................... 106/696; 106/639; 106/692; 106/696; 106/737; 106/772; 106/788; 106/726; 106/727; 106/730; 106/732; 106/780; 106/819; 106/820; 106/823; 507/103; 507/129; 507/135; 507/136; 507/139; 507/140; 507/906
(58) Field of Search ................................ 106/639, 692, 106/696, 737, 772, 788, 726, 727, 730, 732, 778, 780, 819, 820, 823, 103, 129; 507/135, 136, 139, 140, 906

(56) References Cited

U.S. PATENT DOCUMENTS

| 5,389,706 A | 2/1995 | Heathman et al. ............. 524/5 |
| 5,588,489 A | 12/1996 | Chatterji et al. ............. 166/293 |
| 5,711,383 A | 1/1998 | Terry et al. .................... 175/72 |
| 5,711,801 A | 1/1998 | Chatterji et al. ............. 106/789 |
| 5,749,418 A | 5/1998 | Mehta et al. ................ 166/292 |
| 5,749,963 A * | 5/1998 | Arnold et al. ............... 106/724 |
| 5,820,670 A * | 10/1998 | Chatterji et al. ............. 106/727 |
| 5,871,577 A | 2/1999 | Chatterji et al. ............. 106/808 |
| 5,897,699 A | 4/1999 | Chatterji et al. ............. 106/678 |
| 5,980,628 A * | 11/1999 | Hjelmeland et al. ........ 106/778 |

FOREIGN PATENT DOCUMENTS

| JP | HEI 4-5002 | 1/1992 | |
| WO | WO 90/11977 | 10/1990 | ........... C04B/18/08 |
| WO | WO 95/25700 | 9/1995 | ........... C04B/14/06 |
| WO | WO 99/28264 | 6/1999 | ........... C04B/24/06 |

OTHER PUBLICATIONS

XP002154567 Derwent Publications Ltd., London, GB, Apr. 15, 1993.
XP002154568 Derwent Publications Ltd., London, GB, Dec. 22, 1986.
XP000285808 Chemical Abstracts, May 4, 1992; vol. 116, No. 18, Columbus, OH.

* cited by examiner

*Primary Examiner*—Elizabeth D. Wood
(74) *Attorney, Agent, or Firm*—Craig W. Roddy; C. Clark Dougherty, Jr.

(57) ABSTRACT

The present invention provides improved early-enhanced strength cement compositions and methods. The cement compositions can be utilized in surface construction projects as well as in the construction of oil, gas and water wells. The improved cement compositions of this invention are basically comprised of a hydraulic cement, water present in an amount sufficient to form a slurry and hydrophobic silica powder.

18 Claims, No Drawings

EARLY-ENHANCED STRENGTH CEMENT COMPOSITIONS AND METHODS

BACKGROUND OF THE INVENTION

1. Field of the Invention

The present invention relates to early-enhanced strength foamed and non-foamed cement compositions that can be utilized in a variety of applications.

2. Description of the Prior Art

Hydraulic cement compositions, both foamed and non-foamed, are commonly utilized in surface construction applications as well as in the construction of oil, gas and water wells. For example, in the construction of wells, hydraulic cement compositions are used in primary cementing operations whereby strings of pipe such as casing and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe in the well bore and bonds the exterior surfaces of the pipe to the walls of the well bore whereby the undesirable migration of fluids between zones or formations penetrated by the well bore is prevented.

In carrying out primary cementing, the foamed or non-foamed cement compositions utilized must have adequate pumping time before placement and relatively short set times after placement within which the cement compositions attain high compressive strengths. If a well cement composition is slow to set, pressurized formation fluids can flow into and through the cement composition before and after it sets. Also, in well construction, it is important that the cement composition used sets and attains compressive strength as quickly as possible in order to prevent long drilling rig down time and the high costs associated therewith. Similar situations exist in surface construction projects.

Heretofore, inorganic salts such as calcium chloride, sodium chloride and the like have been used as set accelerators and compressive strength enhancers in cement compositions. However, in very low temperature applications, such salts are relatively ineffective in providing accelerated set times and enhanced compressive strengths. Also, the heretofore used inorganic salts must often be used in high concentrations as a result of low temperature conditions to produce enhanced compressive strengths. The high concentrations drastically reduce the placement or pumping times of the cement compositions that are often too short for placing the compositions in the required locations. When set-retarding agents are utilized to increase the placement or pumping times of the compositions, the enhanced compressive strength development of the cement compositions is also lost. Another disadvantage associated with the use of chloride salts is that suchksalts can cause steel pipe or steel structural members in contact with cement compositions containing the salts to rapidly corrode.

Thus, there are continuing needs for improved early-enhanced strength cement compositions for use in surface construction projects and in the construction of wells.

SUMMARY OF THE INVENTION

The present invention provides improved early-enhanced strength cement compositions and methods that meet the above-described needs and overcome the deficiencies of the prior art. The improved early-enhanced strength cement compositions of this invention are basically comprised of a hydraulic cement, water present in an amount sufficient to form a slurry and hydrophobic silica powder present in the compositions in an amount sufficient to provide early and enhanced compressive strength to the compositions. The hydrophobic silica is preferably present in the cement compositions in an amount in the range of from about 0.3% to about 5% by weight of cement in the compositions.

If the time between when a cement composition of this invention is formed and when the composition sets is too short to place the composition in a desired location, a known set-retarding additive can be added to the composition to increase the placement time without affecting the enhanced compressive strength development of the cement composition.

The present invention also provides lightweight cement compositions, i.e., non-foamed cement compositions that have low densities, but provide high compressive strengths for cementing subterranean zones having low fracture gradients or for use in the construction industry generally.

The methods of this invention for cementing a construction zone are basically comprised of the following steps. A cement composition is formed comprised of hydraulic cement, water present in an amount sufficient to form a slurry and hydrophobic silica powder. The composition is placed in the construction zone, and then allowed to set into a hard impermeable mass therein.

It is, therefore, a general object of the present invention to provide improved early-enhanced strength cement compositions and methods.

Other and further objects, features and advantages of the present invention will be readily apparent to those skilled in the art upon a reading of the description of preferred embodiments which follows.

DESCRIPTION OF PREFERRED EMBODIMENTS

The phrase "early-enhanced strength cement composition" is used herein to mean a cement composition that has an accelerated set time and also has enhanced compressive strength after setting. Prior to this invention, inorganic salts such as calcium chloride, sodium chloride and the like have been used in cement compositions as set accelerators and compressive strength enhancers. However, in low temperature applications, i.e., applications wherein the cement temperature is in the range of from about 40° F. to about 70° F., such salts are relatively ineffective in providing an early set or enhanced compressive strength to a cement composition. Also, such inorganic salts must often be used in high concentrations whereby they decrease the placement or pumping time, i.e., the time between cement composition preparation and when the cement composition sets, to a time period so short that the composition can not be placed or pumped into a desired location. Further, when chloride salts are utilized in cement compositions, they often cause corrosion to steel members in contact with the set cement compositions containing the salts.

The improved early-enhanced strength cement compositions of this invention attain early-enhanced compressive strengths over a broad temperature range including at the low temperatures often encountered in offshore wells and in many surface construction projects, i.e., temperatures in the overall range of from about 40° F. to about 130° F. Another novel beneficial characteristic of the cement compositions of this invention is that when longer placement or pumping times are required, a set-retarding agent can be utilized without affecting the enhanced compressive strengths attained by the compositions.

As mentioned, the early-enhanced strength cement compositions of this invention can be foamed or non-foamed.

The non-foamed cement compositions are basically comprised of a hydraulic cement, water present in an amount sufficient to form a slurry and hydrophobic silica powder to provide early and enhanced compressive strength to the cement compositions and/or to provide lightweight to the cement compositions. The foamed cement compositions are the same as the non-foamed compositions except that they further include a gas present in an amount sufficient to form a foam and a mixture of foaming and foam stabilizing surfactants present in an effective amount.

A variety of hydraulic cements can be utilized in the foamed and non-foamed compositions including, but not limited to, those comprised of calcium, aluminum, silicon, oxygen and/or sulfur which set and harden by reaction with water. Such hydraulic cements include Portland cements, pozzolana cements, gypsum cements, high aluminum content cements and high alkalinity Cements. Portland cements are generally preferred for use in the construction of oil, gas and water wells. Portland cements of the types defined and described in *API Specification For Materials And Testing For Well Cements*, API Specification 10, 5th Edition, dated Jul. 1, 1990 of the American Petroleum Institute are particularly suitable. Preferred such API Portland cements include classes A, B, C, G and H, with API classes G and H being more preferred and class G being the most preferred.

The water in the cement compositions can be fresh water, unsaturated salt solutions and saturated salt solutions including brines and seawater. The water is generally present in a cement composition of this invention in an amount sufficient to form a slurry which can be poured or pumped, i.e., in an amount in the range of from about 30% to about 150% by weight of cement in the composition.

The hydrophobic silica powder in the compositions of this invention brings about the early and enhanced compressive strengths of the compositions. That is, the hydrophobic silica powder accelerates the time required for a cement composition of this invention to set and also brings about the attainment of enhanced high compressive strength by the set cement composition. As mentioned above, if the set time of a cement composition of this invention is too short to place or pump the cement composition into a desired location, a known set-retarder of the type described hereinbelow can be included in the cement composition without affecting the attainment of enhanced compressive strength by the composition.

The hydrophobic silica powder used in accordance with this invention is preferably silicone oil treated precipitated silica. The precipitated silica can be prepared by simultaneously adding sulfuric acid and sodium silicate solutions to water with agitation. The pH of the mixture during the reaction is maintained above about 9 whereby smaller particles are continuously dissolved during the precipitation of silica. As a result, uniform particle sizes are obtained. During the precipitation process, the properties of the silica can be varied by changing the ratio of reactants, the reaction time, the reaction temperature and the reaction mixture concentrations. The suspension that results from the precipitation process is filtered and dried followed by milling to reduce the size of the precipitated silica.

The precipitated silica is hydrophobicized by spraying it with a uniform coating of silicone oil (polydialkylsiloxane) followed by heating. The quantity of silicone oil utilized is usually about 10% by weight of the precipitated silica. Particularly preferred such hydrophobic silica powder for use in accordance with this invention is commercially available under the trade designations SIPERNAT D-11™ and SIPERNAT D-13™ from the Degussa Company having a place of business in Chester, Pennsylvania. The SIPERNAT D-11™ has a BET surface area of about 90 square centimeters per gram while the SIPERNAT D-13™ has a BET surface area of about 85 square centimeters per gram. Other properties of the products are the same and are as follows: average particle size-less than 5 microns; tapped density-120 grams per liter; pH-9.5 to 11.5; moisture loss at 105° C. after 2 hours-1.5%; ignition loss after 2 hours at 1,000° C.–5%; methanol wettability-greater than about 60%; $SiO_2$ content-98%; and $Na_2SO_4$ content-2%. The hydrophobic silica powder is generally included in a cement composition of this invention in an amount in the range of from about 0.3% to about 5% by weight of the cement in the composition.

In preparing the compositions of this invention, a suitable dispersing agent can be included therein to facilitate mixing and lower the viscosities of the compositions. An example of a particularly suitable dispersing agent which can be utilized is the sodium salt of naphthalene sulfonate condensed with formaldehyde which is commercially available from Halliburton Energy Services of Duncan, Oklahoma under the trade designation CFR-2™. Such dispersing agents are also referred to as "plasticizers" and "superplasticizers" in the concrete industry.

A non-foamed cement composition of this invention including the above-described components can include hydrophobic silica as a density-reducing additive. Density reducing additives such as hollow glass beads and the like have heretofore been utilized in well cement compositions to prevent excessive hydrostatic pressures from being exerted on formations penetrated by the well bore. Other cement compositions have utilized silicate salts, and silica fume which require excess water to reduce density; however, excess water contributes to numerous undesirable cement composition properties such as solids settling, free water and low compressive strength. Lightweight additives such as bentonite, sodium metasilicate and the like have been utilized to control free water, but they do not prevent low compressive strength.

In accordance with the present invention, a non-foamed cement composition can be made lightweight by including hydrophobic silica powder in the cement composition. That is, in addition to the hydrophobic silica powder included in a cement composition of this invention to provide the early-enhanced strength properties thereto, additional hydrophobic silica powder can be included to reduce the density of the composition. The hydrophobic silica powder has a very low bulk density, i.e., a bulk density in the range of about 0.12 grams per cubic centimeter. Due to its small particle size, high surface area and air trapped in its porous structure, when hydrophobic silica powder is mixed in a cement slurry it functions like small air pockets that reduce the density of the cement composition. When used as a density reducing agent, the additional hydrophobic silica powder is added to a cement composition so that the composition contains hydrophobic silica powder in a total amount up to about 5% by weight of cement in the composition. The high levels of hydrophobic silica required to reduce density require the use of dispersants or "plasticizers" to improve the workability of the cement or concrete slurry. Additionally, to ensure a homogeneous distribution of hydrophobic silica in cement slurries, water wetting agents such as surfactants or surface tension reducing polymers may be used.

The water wetting surfactants which can be utilized in the cement compositions of this invention include, but are not limited to, non-ionic ethoxylated fatty alcohols or their anionic sulfate salts. Examples of the non-ionic ethoxylated fatty alcohols which can be used include ethoxylated nonylphenols with 3 to 12 moles of ethylene oxide. Examples of the anionic sulfate salts of ethoxylated fatty alcohols which can be used include fatty acid alcohol ether sulfates where the fatty acids are lauryl, coco or the like and are ethoxylated with from 3 to 12 moles of ethylene oxide and then sulfated.

The water wetting polymers which can be utilized include, but are not limited to, polymeric surfactants in which the ratio of hydrophilic to lipophilic moieties is balanced whereby they are water soluble, but yet reduce the surface and interference tensions at the water-air interface. Examples of such polymeric surfactants which can be used include hydroxyalkylcelluloses, e.g., hydroxyethylcellulose, partially hydrolyzed polyvinyl acetates and lignosulfonates.

The above described water wetting surfactants and water wetting polymers can be combined with the cement compositions of this invention in amounts in the range of from about 50 to about 1,000 parts per million parts by weight of hydraulic cement in the compositions. Small amounts of deaerating agents such as polydimethylsiloxane, or polypropylene glycol suspension, can be included in the cement compositions as needed to reduce or prevent the entrainment of air therein during preparation.

The foamed compositions of this invention can include the same cement, water, hydrophobic silica, dispersing agent and water wetting agent components described above for the non-foamed cement compositions in the amounts given. In addition to those components, the foamed cement compositions include a gas present in an amount sufficient to form a foam and a mixture of foaming and foam stabilizing surfactants present in an effective amount.

The gas is preferably selected from air and nitrogen, with nitrogen being the most preferred. While various mixtures of known foaming and foam stabilizing surfactants can be utilized to facilitate the formation of a foam and stabilize it, a preferred surfactant mixture is comprised of 2 parts by weight of an ethoxylated alkyl ether sulfate foaming surfactant having the general formula

$H(CH_2)_n(OC_2H_4)_mOSO_3Na$ wherein n is an integer in the range of from about 6 to about 10 and m is an integer in the range of from about 3 to about 10, and about 1 part by weight of a betaine foam stabilizing surfactant having the general formula

$R—CONHCH_2CH_2CH_2N^+ (CH_3)_2CH_2CO_2—$ wherein R is a radical selected from the group of decyl, cetyl, oleyl, lauryl and cocoyl. The mixture of foaming and foam stabilizing surfactants is generally present in a foamed cement composition of this invention in an amount in the range of from about 0.75% to about 5% by weight of water in the composition.

As mentioned above, if either of the foamed or non-foamed early-enhanced strength cement compositions of this invention do not have a placement or pumping time of long enough duration, a known set-retarding agent can be included in the cement composition which lengthens the placement or pumping time without affecting the enhanced compressive strength of the composition after it sets. Examples of suitable such set-retarding agents which can be utilized in accordance with this invention include, but are not limited to, sodium lignosulfonate, hydroxycarboxylic acids such as tartaric, citric and gluconic acids and synthetic polymers such as copolymers of AMPS™ and acrylic or maleic or itaconic acid or modified cellulose derivatives such as carboxymethylhydroxy- ethyl cellulose. Of these, sodium lignosulfonate is preferred. When used, the set-retarding agent is included in a foamed or non-foamed cement composition of this invention in an amount in the range of from about 0.1% to about 3% by weight of cement in the composition.

The methods of the present invention for cementing a construction zone on the surface or in a subterranean formation penetrated by a well bore comprises the following steps. A foamed or non-foamed early-enhanced strength cement composition of this invention as described above is formed. Thereafter, the cement composition is placed or pumped into the construction zone, and the cement composition is allowed to set into a hard impermeable mass therein.

To further illustrate the improved cement compositions and methods of this invention, the following examples are given.

EXAMPLE 1

Non-foamed cement compositions with and without hydrophobic silica powder were prepared utilizing Portland Class H cement and various amounts of synthetic seawater. The compositions including hydrophobic silica powder contained different amounts of the hydrophobic silica powder. Test portions of each of the cement compositions were tested in accordance with the procedures set forth in the API Specification 10 mentioned above to determine the times required for the compositions to set at a temperature of 120 F and a pressure of 1,000 psi. The 24-hour compressive strengths of the set cement compositions at the same temperature and atmospheric pressure were also determined by curing the samples in a thermostated water bath followed by determining their compressive strengths. Further, additional test portions of the cement compositions were tested using an Ultrasonic Cement Analyzer to determine their strength development profiles as a function of time at a temperature of 120 F and pressure of 1,000 psi. The results of these tests are given in Table I below.

TABLE I

Non-Foamed Cement Composition Set Times and Compressive Strengths

| Test Cement[1] Composition No. | Quantity of Water[2] In Composition % by weight of cement | Quantity of Hydrophobic Silica Powder[3] In Composition, % by weight of cement | Composition Density, lb/gal | Set Time[4] at 1000 psi and 120° F. hr:min | 24-Hour Compressive Strength[4] at 120° F. | Time[5] to Reach a Compressive Strength of 500 psi at 1000 psi and 120° F. hr:min | 24-Hour Compressive Strength[5] at 1000 psi and 120° F., psi |
|---|---|---|---|---|---|---|---|
| 1 | 40   | 0   | 16.25 | 2:35 | 2240 | 6:47 | 2226 |
| 2 | 38   | 0.5 | 16.25 | 1:57 | 3030 | 5:03 | 2556 |
| 3 | 41.3 | 0   | 16.1  | 2:56 | 2360 | 7:23 | 1976 |
| 4 | 38   | 1   | 1.61  | 1:25 | 2970 | 4:03 | 2265 |

[1]Portland Class H cement
[2]Synthetic seawater with a few drops of a defoaming agent added thereto
[3]BET surface area of 90 m²/g and an average particle size of about 5 microns

TABLE I-continued

Non-Foamed Cement Composition Set Times and Compressive Strengths

| Test Cement[1] Composition No. | Quantity of Water [2] In Composition % by weight of cement | Quantity of Hydrophobic Silica Powder[3] In Composition, % by weight of cement | Composition Density, lb/gal | Set Time[4] at 1000 psi and 120° F. hr:min | 24-Hour Compressive Strength[4] at 120° F. | Time[5] to Reach a Compressive Strength of 500 psi at 1000 psi and 120° F. hr:min | 24-Hour Compressive Strength[5] at 1000 psi and 120° F., psi |
|---|---|---|---|---|---|---|---|

[4]In accordance with API Specification 10
[5]Using an Ultrasonic Cement Analyzer From Table I, it can readily be seen that the presence of hydrophobic silica powder in non-foamed cement compositions accelerated the set times and enhanced the compressive strengths of the set cement compositions.

EXAMPLE 2

Foamed cement compositions with and without hydrophobic silica powder and containing various other components were prepared utilizing Portland Class A cement and seawater in an amount of 38% by weight of the cement in the compositions. The compositions containing hydrophobic silica powder contained different amounts of the hydrophobic silica powder and hydrophobic silica powders having different surface areas. Several of the cement compositions included hydrophilic silica powder instead of hydrophobic silica powder. Finally, some of the cement compositions contained a dispersing agent comprised of the sodium salt of naphthalene sulfonate condensed with formaldehyde (Halliburton "CFR-2")

All of the compositions were foamed with air and contained a mixture of foaming and foam stabilizing surfactants comprised of 2 parts by weight of an ethoxylated alkyl ether sulfate foaming surfactant and 1 part by weight of a betaine foam stabilizing surfactant.

Unfoamed test portions of each of the compositions described above were tested in accordance with the procedures set forth in the API Specification 10 mentioned above to determine their thickening times at 65° F. and a pressure of 1,000 psi. Foamed test portions of each of the cement compositions were tested to determine the 24-hour compressive strengths of the compositions after setting at either temperatures of 45° F. or 55° F. and at atmospheric pressure in thermostated water baths. The compressive strength tests were also conducted in accordance with the procedures set forth in the above mentioned API Specification 10. Further, additional test portions of the unfoamed cement compositions were tested using an Ultrasonic Cement Analyzer to determine the compressive strength development profiles of the cement compositions as a function of time at 65° F. and 1,000 psi. The strength values at 12 hours were also determined. Additionally, the thicknesses of the cement compositions before being foamed were observed. The results of these tests are given in Table II below.

TABLE II

Foamed Cement Composition Set Times and Compressive Strengths

Components in Cement Compositions in Addition to Cement and Seawater

| Test Cement[1] Composition No. | Hydrophobic Silica Powder[2], % by wt. of cement | Hydrophobic Silica Powder[3], % by wt. of cement | Set-retarder[4], % by wt. of cement | Hydrophilic Silica Powder[5], % by wt. of cement | Hydrophilic Silica Powder[6], % by wt. of cement | Dispersing Agent[7], % by wt. of cement | Cure Temperature °F. | 24 Hour Compressive Strength at Cure Temp, psi | Thickening Time at 1000 psi and 65° F. hrs:min | 12 Hour Compressive Strength[8] | Observations of Unfoamed Slurry Thickness |
|---|---|---|---|---|---|---|---|---|---|---|---|
| 1 [Control] | — | — | — | — | — | — | 45 | 338 | 2:05 | 1260 | Good |
| 2 [Control] | — | — | — | — | — | — | 55 | 610 | — | — | — |
| 3 | 0.5 | — | — | — | — | — | 45 | 532 | 1:36 | 1350 | Thick |
| 4 | 0.5 | — | — | — | — | — | 55 | 898 | — | — | — |
| 5 | 1 | — | — | — | — | — | 45 | 746 | 1:20 | 1560 | Thick |
| 6 | 1 | — | — | — | — | — | 55 | 1341 | — | — | — |
| 7 | 1.5 | — | — | — | — | — | 45 | 680 | 0:50 | 1520 | Very Thick |
| 8 | 1.5 | — | — | — | — | — | 55 | 1183 | — | — | — |
| 9 | — | 0.5 | — | — | — | — | 45 | 681 | 1:23 | 1260 | Thick |
| 10 | — | 0.5 | — | — | — | — | 55 | 1203 | — | — | — |
| 11 | — | 1 | — | — | — | — | 45 | 780 | 1:26 | 1510 | Thick |
| 12 | — | 1 | — | — | — | — | 55 | 1222 | — | — | — |
| 13 | — | 1.5 | — | — | — | — | 45 | 789 | 1:08 | 1350 | Very Thick |
| 14 | — | 1.5 | — | — | — | — | 55 | 1358 | — | — | — |
| 15 | — | 2 | 0.3 | — | — | — | 45 | 752 | 2:03 | 1410 | Very Thick |
| 16 | — | 2 | 0.3 | — | — | — | 55 | 1267 | — | — | — |
| 17 | — | — | — | 1 | — | — | 45 | 525 | 1:07 | 1140 | Thick |
| 18 | — | — | — | 1 | — | — | 55 | 942 | — | — | — |
| 19 | — | — | — | — | 1 | — | 45 | 497 | 0:53 | 1890 | Thick |
| 20 | — | — | — | — | 1 | — | 55 | 834 | — | — | — |
| 21 | — | — | — | — | — | 2.25 | 45 | — | 1:37 | 1300 | Good |
| 22 | — | — | — | — | — | 1 | 45 | — | — | — | Fair |

[1]Portand Class A cement
[2]BET surface area of 85 m²/g and an average particle size of about 5 microns
[3]BET surface area of 90 m²/g and an average particle size of about 5 microns
[4]Sodium lignosulfonate
[5]BET surface area of 190 m²/g and an average particle size of about 100 microns
[6]BET surface area of 190 m²/g and an average particle size of about 5 microns
[7]Sodium salt of naphthalene sulfonate condensed with fermaldehyde [Halliburton CFR-2 ™]
[8]Using and Ultrasonic Cement Analyzer From Table II, it can be seen that the presence of hydrophobic silica powder in foamed cement compositions accelerates the set times and enhances the compressive strengths of the set cement compositions. Further, it can be seen that the hydrophobic silica powder can be used in combination with set-retarders such as lignosulfonates to extend the placement or pumping time without significantly sacrificing compressive strength. For example, as shown in Table II, test cement composition No. 1 without hydrophobic silica powder has a pump time of 2 hours and 5 minutes and compressive strengths of 338 psi at 45° F. and 610 psi at 55° F. As shown for test cement composition No. 15, when 2% hydrophobic silica powder was used in combination with 0.3% sodium lignosulfonate set-retarder, the pump time remains at 2 hours and 3 minutes, but the compressive strengths increased to 752 psi at 45° F. and 1267 psi at 55° F. Finally, the non-foamed cement compositions containing hydrophobic silica powder tend to be thick or viscous. However, when the compositions are foamed, the resulting foamed cement compositions have normal viscosities. The viscosities of the non-foamed cement compositions can be controlled by adding cement composition dispersing agents thereto.

EXAMPLE 3

Additional non-foamed cement compositions were prepared utilizing Portland Class H cement, various amounts of tap water and various amounts of hydrophobic silica powder. A control cement composition without hydrophobic silica powder was prepared and some of the compositions included a cement-dispering agent. The densities of the various cement compositions were measured to determine the density reductions brought about by the presence of hydrophobic silica powder in the cement compositions. The results of these tests are set forth in Table III below.

TABLE III

Cement Composition Density Reduction With Hydrophobic Silica Powder

| Test Cement[1] Composition No. | Quantity of Water in Cement Composition, % by wt. of cement | Quantity of Hydrophobic Silica Powder[2] in Cement Composition, % by wt. of cement | Quantity of Dispersing Agent[3] in Cement Composition, % by wt. of cement | Cement Composition Density lb/gal |
|---|---|---|---|---|
| 1 | 39 | — | — | 16.4 |
| 2 | 39 | 1 | — | 14.8 |
| 3 | 39 | 2 | 0.23 | 14.6 |
| 4 | 39 | 3 | 0.35 | 14.4 |
| 5 | 43 | 1 | — | 14.3 |
| 6 | 54 | 2.8 | — | 11.9 |

[1]Portland Class H cement
[2]BET surface area of 90 m$^2$/g and an average particle size of about 5 microns
[3]Condensate reaction product of acetone, formaldehyde and sodium bisulfite commercially available from Halliburton under the trade designation "CFR-3 ™"

From Table III, it can be seen that the addition of hydrophobic silica to a non-foamed cement composition brings about a reduction in density of the cement composition.

EXAMPLE 4

A non-foamed cement composition of the present invention was prepared utilizing Portland Class H cement, water and hydrophobic silica powder. In addition, two other cement compositions of the same density were prepared utilizing Portland Class H cement, water and two different liquid density reducing agents sold by Halliburton Energy Services under the trade designations "SILICALITE™" and "ECONOLITEW™."

The above described cement compositions were cured at a temperature of 155° F. in an autoclave at 3,000 psi and the compressive strengths of the cured cement compositions were determined in accordance with the procedures set forth in the above mentioned API Specification 10. The results of these tests are set forth in Table IV below.

TABLE IV

Compressive Strengths of Cement Compositions Containing Various Density Reducing Additives

| Test Cement[1] Composition No. | Density, lb/gal | Quantity of Water in Cement Composition, % by wt. of cement | Density Reducing Additive Used | Quantity of Density Reducing Additive, % by wt. of cement, or gals, per sack of cement | Cure Temperature ° F. | Compressive Strength at 155° F. and 3000 psi |
|---|---|---|---|---|---|---|
| 1 | 12 | 154 | Hydrophobic Silica Powder[2] | 2.8% | 155 | 579 |
| 2 | 12 | 123 | Liquid Fumed Silica Additive[3] | 1 gal/sk | 155 | 265 |
| 3 | 12 | 133 | Liquid Sodium Silicate Additive[4] | 0.63 gal/sk | 155 | 129 |

[1]Portland Class H cement
[2]BET surface area of 90 m$^2$/g and an average particle size of about 5 microns
[3]Commercially available from Halliburton under trade designation "SILICALITE ™"
[4]Commercially available from Halliburton under trade designation "ECONOLITE ™"

From Table IV, it can be seen that the cement composition of reduced density in accordance with the present invention provides far superior compressive strength than do similar cement compositions containing prior art density reducing agents.

Thus, the present invention is well adapted to carry out the objects and attain the benefits and advantages mentioned as well as those that are inherent therein. While numerous changes to the compositions and methods can be made by those skilled in the art, such changes are encompassed within the spirit of this invention as defined by the appended claims.

What is claimed is:

1. A method of cementing a string of pipe in a well bore comprising the steps of:

(a) forming a cement composition comprised of a hydraulic cement, water present in an amount sufficient to form a slurry and hydrophobic silica powder, said hydrophobic silica powder being present in an amount sufficient to provide early enhanced compressive strength to the composition;

(b) placing said composition in said well bore; and (c) allowing said cement composition to set therein.

2. The method of claim 1 wherein said hydrophobic silica is present in said composition in an amount in the range of from about 0.3% to about 5% by weight of cement therein.

3. The method of claim 1 wherein said hydraulic cement in said composition is selected from the group of Portland cements, pozzolana cements, gypsum cements, high aluminum content cements and high alkalinity cements.

4. The method of claim 1 wherein said water in said composition is selected from the group of fresh water, unsaturated salt solutions and saturated salt solutions.

5. The method of claim 1 wherein said water is present in said composition in an amount in the range of from about 30% to about 150% by weight of cement therein.

6. The method of claim 1 wherein said cement composition further comprises a cement composition density reducing additive.

7. The method of claim 6 wherein said density reducing additive in said composition is additional hydrophobic silica powder.

8. The method of claim 1 wherein said cement composition further comprises a set-retarding agent present therein in an effective amount.

9. The method of claim 1 wherein said cement composition further comprises a gas present in an amount sufficient to form a foam and a mixture of foaming and foam stabilizing surfactants present therein in an effective amount.

10. The method of claim 9 wherein said gas is selected from the group consisting of air and nitrogen.

11. The method of claim 9 wherein said mixture of foaming and foam stabilizing surfactants is comprised of 2 parts by weight of an ethoxylated alkyl ether sulfate foaming surfactant having the general formula $$H(CH_2)_n(OC_2H_4)_mOSO_3Na$$

wherein n is an integer in the range of from about 6 to about 10 and m is an integer in the range of from about 3 to about 10, and about 1 part by weight of a betaine foam stabilizing surfactant having the general formula $$R-CONHCH_2CH_2CH_2N^+(CH_3)_2H_2CO_2-$$

wherein R is a radical selected from the group of decyl, cetyl, oleyl, lauryl and cocoyl.

12. A method of cementing in a wellbore comprising the steps of:

admixing hydrophobic silica powder with hydraulic cement and water to form a cement composition, said water being present in an amount sufficient to form a slurry and said hydrophobic silica powder being present in an amount effective to accelerate the set and enhance the compressive strength of said cement composition;

placing said composition in said well bore; and, allowing said cement composition to set therein.

13. The method of claim 12 wherein said hydrophobic silica is present in an amount in the range of from about 0.3% to about 5% by weight of cement in said composition.

14. The method of claim 12 wherein said composition further comprises a set-retarding agent present in an effective amount.

15. The method of claim 14 wherein said set-retarding agent is selected from the group consisting of sodium lignasulfonate, hydroxycarboxylic acids, synthetic polymers and modified cellulose derivatives.

16. The method of claim 14 wherein said cement composition further comprises a gas present in an amount sufficient to form a foam and a mixture of foaming and foam stabilizing surfactants present therein in an effective amount.

17. The method of claim 16 wherein said gas is selected from the group consisting of air and nitrogen.

18. The method of claim 16 wherein said mixture of foaming and foam stabilizing surfactants is comprised of 2 parts by weight of an ethoxylated alkyl ether sulfate foaming surfactant having the general formula $$H(CH_2)_n(OC_2H_4)_mOSO_3Na$$

wherein n is an integer in the range of from about 6 to about 10 and m is an integer in the range of from about 3 to about 10, and about 1 part by weight of a betaine foam stabilizing surfactant having the general formula $$R-CONHCH_2CH_2CH_2N^+(CH_3)_2CH_2CO_2-$$

wherein R is a radical selected from the group of decyl, cetyl, oieyl, lauryl and cocoyl.

* * * * *